(12) United States Patent
Modarresi et al.

(10) Patent No.: US 11,704,598 B2
(45) Date of Patent: *Jul. 18, 2023

(54) MACHINE-LEARNING TECHNIQUES FOR EVALUATING SUITABILITY OF CANDIDATE DATASETS FOR TARGET APPLICATIONS

(71) Applicant: Adobe Inc., San Jose, CA (US)

(72) Inventors: Kourosh Modarresi, Sunnyvale, CA (US); Hongyuan Yuan, San Jose, CA (US); Charles Menguy, New York, NY (US)

(73) Assignee: ADOBE INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/929,394

(22) Filed: Sep. 2, 2022

(65) Prior Publication Data

US 2023/0004869 A1 Jan. 5, 2023

Related U.S. Application Data

(63) Continuation of application No. 16/274,954, filed on Feb. 13, 2019, now Pat. No. 11,481,668.

(51) Int. Cl.
   *G06N 20/00* (2019.01)
   *G06F 16/22* (2019.01)
   *G06F 16/28* (2019.01)

(52) U.S. Cl.
   CPC ......... *G06N 20/00* (2019.01); *G06F 16/2264* (2019.01); *G06F 16/285* (2019.01)

(58) Field of Classification Search
   CPC .... G06N 20/00; G06F 16/285; G06F 16/2264
   See application file for complete search history.

(56) References Cited

U.S. PATENT DOCUMENTS

| | | | |
|---|---|---|---|
| 9,349,105 B2 * | 5/2016 | Beymer | G06N 20/10 |
| 10,255,628 B2 * | 4/2019 | Li | G06N 3/045 |
| 11,100,421 B2 * | 8/2021 | Kucera | H04L 67/535 |
| 2017/0140023 A1 * | 5/2017 | Modarresi | G06F 16/285 |
| 2017/0286522 A1 * | 10/2017 | Hohwald | G06F 16/438 |

OTHER PUBLICATIONS

Dinuzzo, Elsevier, 2013, pp. 119-126.*
Yamamoto, Elsevier, 2015, pp. 3959-3968.*

(Continued)

*Primary Examiner* — Michael I Ezewoko
(74) *Attorney, Agent, or Firm* — Kilpatrick Townsend & Stockton LLP

(57) ABSTRACT

Techniques disclosed herein relate generally to evaluating and selecting candidate datasets for use by software applications, such as selecting candidate datasets for training machine-learning models used in software applications. Various machine-learning and other data science techniques are used to identify unique entities in a candidate dataset that are likely to be part of target entities for a software application. A merit attribute is then determined for the candidate dataset based on the number of unique entities that are likely to be part of the target entities, and weights associated with these unique entities. The merit attribute is used to identify the most efficient or most cost-effective candidate dataset for the software application.

20 Claims, 11 Drawing Sheets

(56) References Cited

OTHER PUBLICATIONS

U.S. Appl. No. 16/274,954, Notice of Allowance, dated Jun. 28, 2022, 25 pages.
Dinuzzo, "Learning Output Kernels for Multi-Task Problems", Neurocomputing, vol. 118, Oct. 22, 2013, pp. 119-126.
Mazumder et al., "Spectral Regularization Algorithms for Learning Large Incomplete Matrices", Journal of Machine Learning Research, vol. 11, Aug. 2010, pp. 2287-2322.
Yamamoto et al., "Clustering of Multivariate Binary Data with Dimension Reduction Via L1-Regularized Likelihood Maximization", Pattern Recognition, vol. 48, No. 12, Dec. 2015, pp. 3959-3968.

\* cited by examiner

|       | $t_1$ | $t_2$ | $t_3$ | $t_4$ | $t_5$ |
|-------|-------|-------|-------|-------|-------|
| $u_1$ | 1     | 0     |       | 1     |       |
| $u_2$ | 1     | 1     |       | 0     |       |
| $u_3$ |       |       | 1     | 1     |       |
| ⋮     |       |       |       |       |       |
| $u_{100}$ |   |       | 0     | 1     |       |

```
┌─────────────────────────────────────────────────────────────────────┐
│ Generate a matrix that includes entities from a reference dataset    │
│ including first entities and a candidate dataset including second    │
│ entities                                                             │
│ 410                                                                  │
└─────────────────────────────────────────────────────────────────────┘
                                  │
                                  ▼
┌─────────────────────────────────────────────────────────────────────┐
│ Determine missing elements in the matrix using matrix completion     │
│ (e.g., spectral regularization) techniques                           │
│ 420                                                                  │
└─────────────────────────────────────────────────────────────────────┘
                                  │
                                  ▼
┌─────────────────────────────────────────────────────────────────────┐
│ Form, in a multi-dimensional space, a cluster of data points         │
│ representing the first entities based on the features other than a   │
│ baseline feature                                                     │
│ 430                                                                  │
└─────────────────────────────────────────────────────────────────────┘
                                  │
                                  ▼
┌─────────────────────────────────────────────────────────────────────┐
│ Determine an average reference distance between the data point       │
│ representing the first entities                                      │
│ 440                                                                  │
└─────────────────────────────────────────────────────────────────────┘
                                  │
                                  ▼
┌─────────────────────────────────────────────────────────────────────┐
│ For each unique entity in the second entities that is not described  │
│ as associated with the baseline feature, determine an average        │
│ candidate distance between the entity and the first entities in the  │
│ multi-dimensional space                                              │
│ 450                                                                  │
└─────────────────────────────────────────────────────────────────────┘
                                  │
                                  ▼
┌─────────────────────────────────────────────────────────────────────┐
│ For each entity in the second entities that is not described as      │
│ associated with the baseline feature, determine whether the entity   │
│ is associated with the baseline feature based on the average         │
│ candidate distance and the average reference distance                │
│ 460                                                                  │
└─────────────────────────────────────────────────────────────────────┘
```

*FIG. 4*

|       | $t_1$ | $t_2$ | $t_3$ | $t_4$ | $t_5$ | ... | ... | ... | $t_{m-2}$ | $t_{m-1}$ | $t_m$ |
|-------|-------|-------|-------|-------|-------|-----|-----|-----|-----------|-----------|-------|
| $U_1$ | 1 | 0 | 1 | 0 | 1 | | | | | | |
| $U_2$ | 1 | 1 | 0 | 1 | 1 | | | | | | |
| $U_3$ | 1 | 0 | 0 | 1 | 1 | | | | | | |
| $U_4$ | 1 | 1 | 1 | 0 | 0 | | | | | | |
| ... | | | | | | | | | | | |
| ... | | | | | | | | | | | |
| ... | | | | | | | | | | | |
| $U_{n-3}$ | 1 | | | | 0 | | | | 1 | 0 | 1 |
| $U_{n-2}$ | 0 | | 1 | | 1 | | | | 0 | 1 | 0 |
| $U_{n-1}$ | | | | 1 | | | | | 1 | 1 | 0 |
| $U_n$ | | 1 | | | | | | | 0 | 1 | 1 |

*FIG. 5*

MACHINE-LEARNING TECHNIQUES FOR EVALUATING SUITABILITY OF CANDIDATE DATASETS FOR TARGET APPLICATIONS

CROSS-REFERENCE TO RELATED APPLICATIONS

This application is a Continuation of U.S. application Ser. No. 16/274,954, filed Feb. 13, 2019, the content of which is incorporated herein by reference.

TECHNICAL FIELD

This disclosure relates generally to artificial intelligence, machine learning, and other data science technologies. More specifically, but not by way of limitation, this disclosure relates to applying machine-learning techniques to determine a merit attribute of a candidate dataset for a particular software application and, in some cases, thereby facilitating selection of more suitable datasets for the given software application.

BACKGROUND

Artificial intelligence and machine-learning techniques can be used to extract knowledge and insights from data in various forms in order to understand and analyze actual phenomena with data. For example, a neural network or other machine-learning model can be trained, using one or more datasets, to extract useful features from similar input data or to make predictions based on the input data. In many cases, the quality or performance (e.g., accuracy and sensitivity) of the machine-learning model or neural network depends on the quantity and quality of the datasets used for the training. Thus, one way to improve the performance of a machine-learning model is to improve the quantity and/or quality of the training datasets.

However, in many circumstances, training datasets and/or other datasets used for artificial intelligence and machine-learning techniques are expensive (in, for example, time, efforts, resources, or price) to collect, accumulate, purchase, or otherwise obtain. In addition, a training process can take a much longer time period (such as days, weeks, or even months or longer in some cases) compared with the inference process. Furthermore, different datasets, even if including similar numbers of entries, may add different values or improvements to existing datasets and the trained model. Thus, there are cases where a dataset is obtained at a high cost and/or is used to train a machine-learning model in a long training process, but adds little or no additional value or improvement to existing datasets and the trained model.

SUMMARY

Embodiments of the present disclosure involve assessment and selection of candidate datasets for a customer application based on machine-learning techniques. According to certain embodiments, a method for applying machine-learning techniques to evaluate candidate datasets for use by software applications includes receiving (i) a reference dataset identifying first entities associated with first features that include a baseline feature of a target population and (ii) a candidate dataset identifying second entities associated with second features; and identifying, in the candidate dataset, first unique candidate entities that are absent from the reference dataset and that are associated with the baseline feature in the candidate dataset. The method also includes forming a cluster of data points representing the first entities in a multi-dimensional space and based on a subset of the first features lacking the baseline feature; mapping a subset of the second entities that are absent from the reference dataset and that are not in the first unique candidate entities to additional data points, respectively in the multi-dimensional space; and identifying, from the subset of the second entities, second unique candidate entities corresponding to a subset of the additional data points within a threshold distance of the cluster. The method further includes determining a merit attribute of the candidate dataset based on a first weight for each first unique candidate entity, a second weight for each second unique candidate entity, a number of the first unique candidate entities in the candidate dataset, and a number of the second unique candidate entities in the candidate dataset; and selecting the candidate dataset as input data for a target software application based on the merit attribute of the candidate dataset being greater than a threshold value.

These illustrative examples are mentioned not to limit or define the disclosure, but to provide examples to aid understanding thereof. Additional embodiments and examples are discussed in the Detailed Description, and further description is provided there.

BRIEF DESCRIPTION OF THE FIGURES

Features, embodiments, and advantages of the present disclosure are better understood when the following Detailed Description is read with reference to the accompanying drawings.

FIG. 3 illustrates an example of an aggregated matrix in which the features in the reference dataset and the features in the candidate dataset do not have any overlap.

FIG. 4 is a flow chart illustrating an example of a method for identifying unique candidate entities in a candidate dataset that are not described as associated with a baseline feature but are likely associated with the baseline feature according to certain embodiments.

FIG. 5 illustrates an example of an aggregated matrix that includes entities from a reference dataset and entities from a candidate dataset.

DETAILED DESCRIPTION

Figure 1:
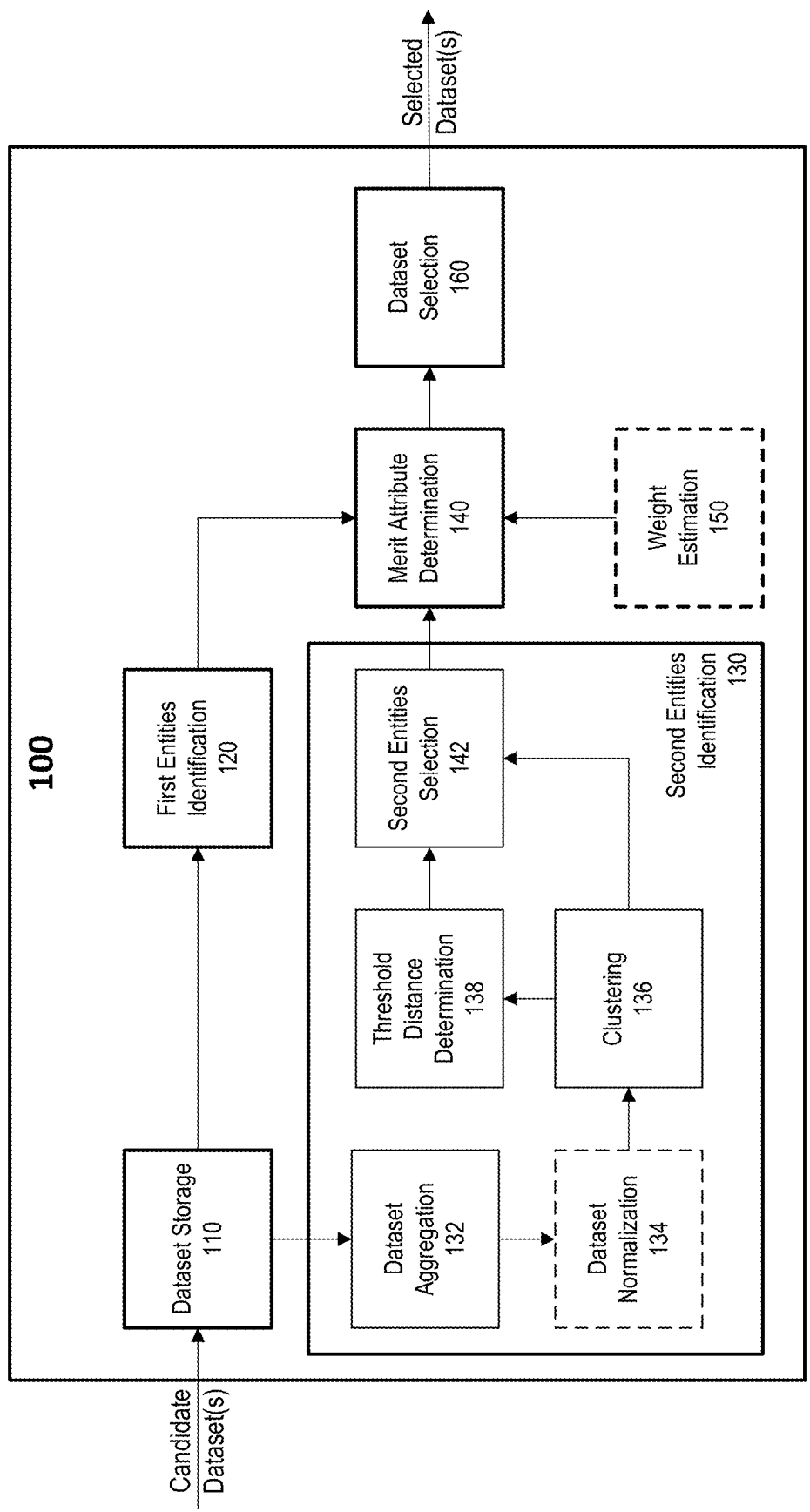
FIG. 1 illustrates an example of a system for evaluating the suitability of candidate datasets for target applications according to certain embodiments.

Techniques disclosed herein relate generally to assessment and selection of candidate datasets for a customer application based on artificial intelligence, machine learning, and other data science technologies. The assessment and selection of candidate datasets include, for example, selecting, from available candidate datasets, one or more datasets that can improve the performance of a machine-learning model the most when used as training data for training the machine-learning model, or one or more datasets that can add the most information to existing datasets. In certain embodiments, various machine-learning and other data science techniques (e.g., clustering and spectral regularization techniques) are used to identify entities in the candidate dataset that are unique and are likely to be part of target entities (e.g., entities with certain features) for the customer application. A merit attribute (e.g., efficiency, cost-effectiveness, potential value of the candidate dataset, or any combination) is then determined based on the number of unique entities that are likely to be part of the target entities for the customer application, and weights associated with these unique entities and determined using, for example, regression techniques. The merit attribute can facilitate dataset expansion by, for example, identifying the most efficient or most cost-effective candidate dataset to be added to existing datasets for the customer application.

The following non-limiting example is used to introduce certain embodiments. In this example, a computing system having one or more processors implements various machine-learning techniques to evaluate candidate datasets for use by software applications. The computing system receives a reference dataset and a candidate dataset, where the reference dataset identifies a first group of entities (e.g., users of a software application or patrons of a merchant) and a first set of features associated with the first group of entities (e.g., gender, age, marriage status, occupation, income, and the like). The first group of entities includes at least one baseline feature, such as age or income, for identifying target entities. The candidate dataset identifies a second group of entities and a second set of features associated with the second group of entities. The second set of features may not include the baseline feature, or may include the baseline feature but lack the values of the baseline feature for at least some entities in the candidate dataset.

Continuing with this example, the computing system identifies, from the candidate dataset, first unique candidate entities that are absent from the reference dataset and that are described in the candidate dataset as associated with the baseline feature. For example, a reference dataset may identify users of a first software application (e.g., a relatively new software application), and a candidate dataset may identify users of a second software application (e.g., a more popular software application), where both datasets may include baseline feature (e.g., age and education information) of at least some users. Some users of the second software application may not be the users of the first software application yet, and the candidate dataset may include the age and education information of at least some of these users, which may be identified as the first unique candidate entities. The computing system also determines that second unique candidate entities in the candidate dataset, which are absent from the reference dataset, are likely associated with the baseline feature even though the candidate dataset does not describe the baseline feature for these second unique candidate entities. For example, in the example described above, the candidate dataset may not include the age and/or education information of some users, but at least a portion of these users are likely to have the baseline feature and thus may be identified as the second unique candidate entities based on other features of these users. To determine that the second unique candidate entities are associated with the baseline feature, the computing system can use machine-learning techniques to form a cluster of the first group of entities in the reference dataset and predict whether an entity in the candidate dataset is part of the target population. For example, the cluster can be formed based on features of the first group of entities other than the baseline feature. The computing system determines that an entity is one of the second unique candidate entities if a distance between the entity and the cluster is less than a threshold distance. The computing system can then determine a merit attribute of the candidate dataset based on weights for the first and second unique candidate entities, a number of first unique candidate entities in the candidate dataset, and a number of second unique candidate entities in the candidate dataset. The weights can be determined using regression techniques, and can represent, for example, the relative confidence level that each of the first or second unique candidate entities may be part of the target population. If the computed merit attribute has a sufficiently high value, the computing system selects the candidate dataset as input data for a target software application (e.g., as a training dataset for a machine-learning model, or for identifying target population).

In one specific implementation, the computing system performs one or more matrix operations for computing the merit attribute and selecting the candidate dataset. The computing system accesses or generates a matrix that includes entities and certain features associated with the entities includes information in both the reference dataset and the candidate dataset. The matrix is normalized (e.g., using spectral regularization techniques) to expand the features for the reference dataset and the candidate dataset. The normalization can include adding missing features for the entities in the candidate dataset and/or the reference dataset. The computing system identifies, from the matrix, unique entities in the candidate dataset that are absent in the reference dataset. Based on information in the normalized matrix, the computing system identifies, from unique entities for which the baseline features are not specified or labeled, second unique candidate entities that are likely to be part of the target population for the customer application using, for example, the cluster-based techniques described above based on various distance metrics.

Techniques disclosed herein use a combination of specific machine-learning techniques and/or rules to evaluate the efficiency, cost-effectiveness, value, and/or other merit attributes of a candidate dataset for a specific application in view of existing datasets. This evaluation can be used to determine whether the candidate dataset is suitable for the specific application and whether the benefits or values of using the candidate dataset is commensurate with the expenditure of resources (e.g., time, effort, or price) to obtain or use the candidate dataset. Thus, techniques disclosed herein can, for example, improve the efficiency and reduce the training time for training a machine-learning model by, for example, selecting training datasets that are most useful (e.g., including the most new entities or other new information) or cost-effective (e.g., at a reasonable cost) for training a modeling algorithm to perform a task with the desired accuracy or precision. Thus, the techniques can minimize the cost and time and thus improve the efficiency for achieving a desired result for the target application.

As used herein, the term "target population" refers to a group of entities that are the target or potential users or patrons of a software application, a service, or a product.

As used herein, the term "traits" or " features" refers to one or more features associated with an entity or an entry in a dataset. Examples of the traits include the identity, personal information, preferences, personality, hobbies, interests, behavioral traits, or capabilities of the entity.

As used herein, the term "baseline traits" or "baseline features" refers to one or more traits that define the target population. For example, trait "shopped at Merchant A" and trait "male" could be a set of baseline used by Merchant A to expand its target population on the basis of these traits. In some embodiments, the baseline traits are specified or defined by a customer or user of a dataset (e.g., Merchant A in the above example).

As used herein, the term "customer dataset" or "reference dataset" refers to, for example, the original dataset owned by a customer or user of datasets, which may include information regarding known target population. The customer dataset can be used as the benchmark to evaluate the merit attribute of candidate datasets (e.g., third-party datasets).

As used herein, the term "candidate dataset" refers to datasets that may potentially be used by a customer for a specific customer application to achieve a goal. The candidate datasets can be provided by, for example, third-party data providers.

As used herein, the term "merit attribute" refers to the efficacy, efficiency, cost-effectiveness, or potential value of a candidate dataset, or any combination. In some embodiments, the merit attribute may be a measure of both the technical value and the economic value of the candidate dataset.

As used herein, the term "neural network" refers to one or more computer-implemented, network-based models capable of being trained to achieve a goal. Unless otherwise indicated, references herein to a neural network include one neural network or multiple interrelated neural networks that are trained together. Examples of neural networks include, without limitation, convolutional neural networks (CNNs), recurrent neural networks (RNNs), fully-connected neural networks, dense-connection neural networks, feed-forward neural networks, and other types of neural networks. In some embodiments, a neural network can be implemented using special hardware (e.g., GPU, tensor processing units (TPUs), or processing element arrays (PE arrays)), using software code and a general purpose processor, or a combination of special hardware and software code.

The following examples are provided to introduce certain embodiments. In the following description, for the purposes of explanation, specific details are set forth in order to provide a thorough understanding of examples of the disclosure. However, it will be apparent that various examples may be practiced without these specific details. For example, devices, systems, structures, assemblies, methods, and other components may be shown as components in block diagram form in order not to obscure the examples in unnecessary detail. In other instances, well-known devices, processes, systems, structures, and techniques may be shown without necessary detail in order to avoid obscuring the examples. The figures and description are not intended to be restrictive. The terms and expressions that have been employed in this disclosure are used as terms of description and not of limitation, and there is no intention in the use of such terms and expressions of excluding any equivalents of the features shown and described or portions thereof. The word "example" is used herein to mean "serving as an example, instance, or illustration." Any embodiment or design described herein as an "example" is not necessarily to be construed as preferred or advantageous over other embodiments or designs.

FIG. 1 illustrates an example of a system 100 for evaluating the suitability of candidate datasets for target applications according to certain embodiments. As illustrated, system 100 includes a data storage module 110 for storing one or more reference datasets and one or more candidate datasets. In some embodiments, the datasets are stored as matrices in data storage module 110. System 100 also includes a first entities identification engine 120 that identifies unique entities in a candidate dataset that are described in the candidate dataset as having baseline features of target population. System 100 further includes a second entities identification engine 130 that identifies unique entities in the candidate dataset that are not described in the candidate dataset as having the baseline features of target population but are predicted to be part of the target population. System 100 includes a merit attribute determination module 140 that determines the merit attribute of the candidate dataset based on the unique entities identified by first entities identification engine 120 and second entities identification engine 130. A dataset selection module 160 then selects, from the received one or more candidate datasets, one or more candidate datasets having merit attributes meeting a certain criterion. In some embodiments, system 100 also includes a weight determination engine 150, which determines weights associated with the unique entities identified by first entities identification engine 120 and second entities identification engine 130. For example, weight determination engine 150 can implement a regression technique to determine appropriate weights for the identified unique entities using some training datasets with known merit attributes, as described in detail below.

In some embodiments, second entities identification engine 130 includes a dataset aggregation module 132 that combines a candidate dataset with a reference dataset, such as representing the candidate dataset and the reference dataset using an aggregated matrix as described in detail below. Second entities identification engine 130 also includes a clustering engine 136 that maps at least some entities in the aggregated matrix to data points in a multi-dimensional space. A threshold distance determination engine 138 determines a threshold distance for identifying unique entities that are likely to be in the target population. For example, threshold distance determination engine 138 can determine the threshold distance based on the average distance between data points representing entities in the reference dataset, such as the average distance between each data point representing a respective entity in the reference dataset and a centroid of a cluster of the data points representing the entities in the reference dataset. A second entities selection engine 142 then selects a subset of entities in the candidate dataset based on the threshold distance and the distance between each data point representing a respective entity in the candidate dataset and the centroid of the cluster of the data points representing the entities in the reference dataset. In some embodiments, second entities identification engine 130 also includes a dataset normalization engine 134 configured to complete the aggregated matrix (e.g., determining missing values in a sparse matrix) before mapping the entities in the aggregated matrix to the multi-dimensional space. The operations of second entities identification engine 130 are described in detail below.

Figure 2:
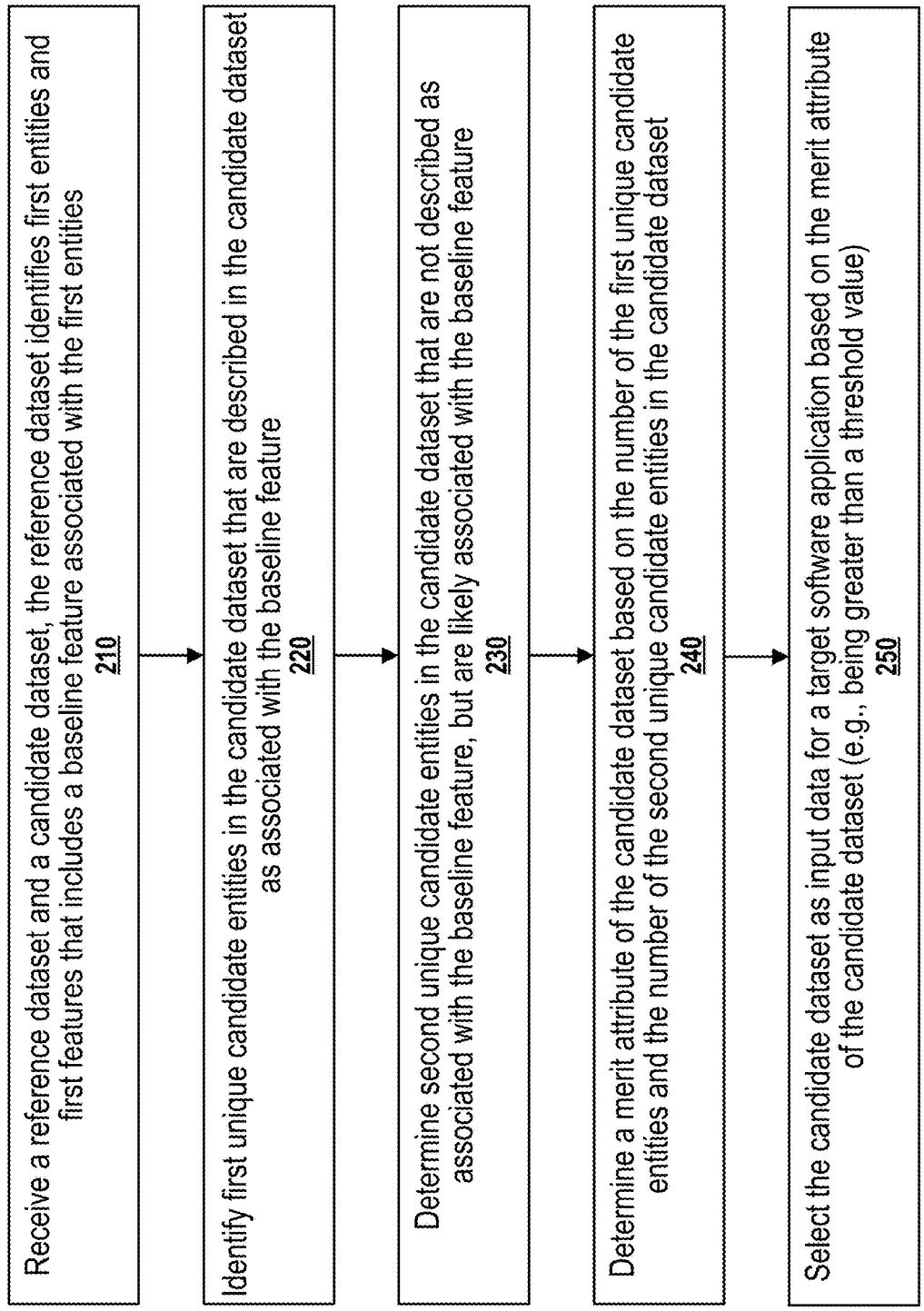
FIG. 2 is a flow chart illustrating an example of a method for applying machine-learning techniques to evaluate candidate datasets for use by software applications according to certain embodiments.

FIG. 2 is a flow chart 200 illustrating an example of a method for applying machine-learning techniques to evaluate candidate datasets for use by software applications according to certain embodiments. The operations in flow chart 200 can be performed by, for example, system 100 described above. The operations in flow chart 200 identify unique entities in a candidate dataset (e.g., a third-party dataset) that are described as sharing the same baseline trait(s) with entities in existing customer dataset (also referred to as reference dataset). The operations then detect other unique entities in the candidate dataset that are not described as having the baseline trait(s) but are likely to be part of the customer's target population, based on, for example, the similarity or "distance" of each unique entity to a cluster of entities that are known to be in the target population of the customer (e.g., entities in the customer dataset). The operations then determine a merit attribute based on the unique entities in the candidate dataset that have or likely have the baseline trait(s), and use the merit attribute to determine whether to add the candidate dataset to the customer dataset.

At block 210, one or more processing devices (e.g., system 100, more specifically, data storage module 110) receive a reference dataset and a candidate dataset. The reference dataset identifies a first group of entities and a first set of features (also referred to as traits) associated with the first group of entities, where the first set of features includes at least one baseline feature. In one example, the entities in the reference dataset include existing patrons of a merchant. The patrons can be identified by their unique identifications, such as names, user names, cell phone numbers, social security numbers, or other labels the uniquely identifying individual patrons. The first set of features can include, for example, gender, age, marriage status, occupation, income, and the like. In some embodiments, the reference dataset is represented by a two-dimensional data matrix, where each row (which may also be referred to as an entry) corresponds to one patron (i.e., entity), and each column corresponds to an identification or a feature of the patron. In some embodiments, the value in an element of the data matrix may be a numerical value, such as a height value, an age value, a time value, and the like. In some embodiments, the value in an element of the data matrix may be a binary value "1" or "0" or a Boolean value "true" or "false," which indicates that the corresponding entity has or does not have the corresponding feature. For example, if one column corresponds to feature "Male," a value "1" in an element in the column indicates that the corresponding entity is a male, while a value "0" in an element in the column indicates that the corresponding entity is not a male. In some embodiments, some features for certain entities may not be available, and thus some elements may be blank or may have a value "NA" (not available) or "NaN" (not a number). The at least one baseline feature is used to identify target population. For example, the at least one baseline feature can include income higher than $100,000 per year. In another example, the at least one baseline feature can include a gender feature (e.g., male) and an age feature (e.g., 20 to 35-years old).

Similarly, the candidate dataset identifies a second group of entities and a second set of features associated with the second group of entities, where the second set of features may or may not include the at least one baseline feature. In some embodiments, the second set of features includes at least some features in the first set of features. In some embodiments, the second set of features includes at least some features that are not in the first set of features. The second group of entities may be identified by their identifications as described above. In some embodiments, the second group of entities includes entities that are not in the first group of entities in the reference dataset. In some embodiments, the second group of entities includes some entities that are also in the first group of entities in the reference dataset. In some embodiments, the candidate dataset is also represented by a two-dimensional data matrix, where each row (i.e., entry) corresponds to one entity in the second group of entities and each column corresponds to a feature in the second set of features.

At block 220, the one or more processing devices (e.g., more specifically, first entities identification engine 120) identify first unique candidate entities in the candidate dataset that are described in the candidate dataset as associated with the baseline feature. For example, the one or more processing devices first identify entities in the candidate dataset that are not included in the reference dataset based on, for example, the identification of the entity in each entry in the datasets. For each unique entity in the candidate dataset that is not in the reference dataset, the one or more processing devices can determine whether the unique entity has the baseline feature, for example, based on the value in the matrix element on the row representing the unique entity and in the column corresponding to the baseline feature. In some embodiments, the one or more processing devices can search row-by-row in the data matrix representing the candidate dataset. In some embodiments, the one or more processing devices can first sort the data matrices representing the reference dataset and the candidate dataset based on, for example, the identifications of the entities and/or the values of the matrix elements in the column representing the baseline feature, and then identify unique entities in the candidate dataset that are described in the data matrix as associated with the baseline feature.

At block 230, the one or more processing devices (e.g., more specifically, second entities identification engine 130) determine second unique candidate entities in the candidate dataset that are not described in the candidate dataset as associated with the baseline feature, but are likely associated with the baseline feature and thus are likely to be part of the target population. For unique entities in the candidate dataset that are not in the reference dataset and are not described as associated with the baseline feature (e.g., the corresponding values are missing or are not available), the one or more processing devices may use machine-learning-based techniques (e.g., spectral regularization and clustering techniques) to determine whether the entities are likely to belong to the target population. An example of a technique for identifying the second unique candidate entities in the candidate dataset are described in detail below with respect to FIG. 4.

At block 240, the one or more processing devices (e.g., more specifically, merit attribute determination module 140) determine a merit attribute of the candidate dataset based on the number of the first unique candidate entities and the number of the second unique candidate entities in the candidate dataset. In some embodiments, the merit attribute of the candidate dataset is the weighted sum of the number of the first unique candidate entities and the number of the second unique candidate entities in the candidate dataset. For example, the weight for each first unique candidate entity may be higher than the weight for each first unique candidate entity. In some embodiments, the weight for each of the first unique candidate entities and the weight for each of the second unique candidate entities can be determined, for example, using a regression technique.

At block 250, the one or more processing devices (e.g., more specifically, dataset selection module 160) select the candidate dataset as input data for a target software application based on the merit attribute of the candidate dataset. For example, the candidate dataset can be added to the reference dataset to generate a larger dataset of target population if the merit attribute is greater than a threshold value. In some embodiments, the candidate dataset may be used to further train a machine-learning model, such as a neural network. In some embodiments, multiple candidate datasets may be evaluated using the techniques disclosed herein and one or more candidate datasets may be selected from the multiple candidate datasets based on their merit attributes.

In some embodiments, to identify the second unique candidate entities in a candidate dataset that likely have the baseline feature or likely belong to the target population, the candidate dataset and a reference dataset for a customer application may be combined to generate an aggregated matrix that includes the entities in the reference dataset and the entities in the candidate dataset. The aggregated matrix may include elements that have no associated values because some features for some entities may not be described in the reference dataset or the candidate dataset. Various matrix completion techniques may be used to complete the aggregated matrix (i.e., filling the missing features) based on existing values in the aggregated matrix. From unique entities for which at least some of the at least one baseline feature are not specified or labeled in the aggregated matrix, candidate entities that are likely to be part of the target population for the customer application are identified using, for example, cluster-based techniques, based on various distance metrics.

It is noted that, in general, the features in the reference dataset may be different from the features in the candidate dataset. In order to determine whether entities in the candidate dataset are likely to have the baseline feature, there needs to be at least some overlap between the features in the reference dataset and the features in the candidate dataset, even though the overlap can be rather insignificant.

Figure 3:
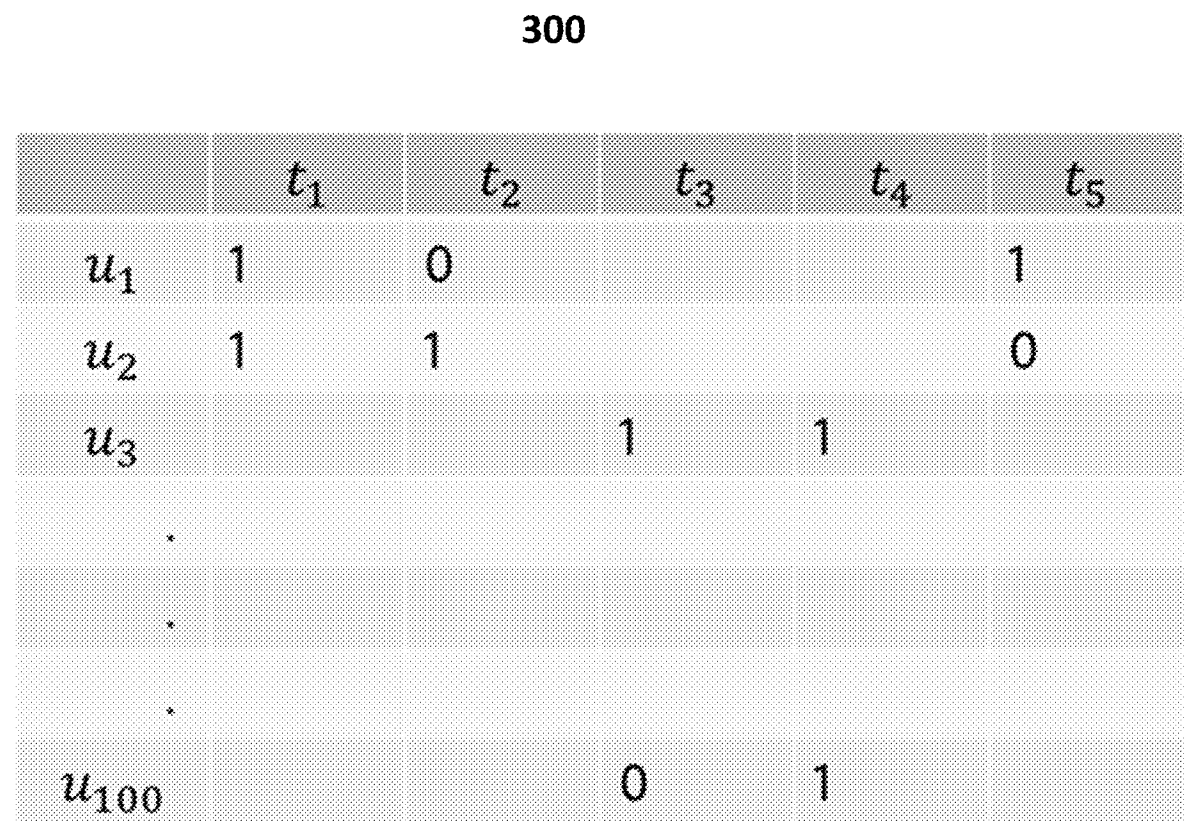

FIG. 3 illustrates an example of an aggregated matrix 300 in which the features in the reference dataset and the features in the candidate dataset do not have any overlap. In the example shown in FIG. 3, the reference dataset (e.g., including entities $u_1$ and $u_2$) has features $t_1$, $t_2$, and $t_5$, and the candidate dataset (e.g., including entities $u_3$ to $u_{100}$) has features $t_3$ and $t_4$. It may be difficult to compare any entity in the candidate dataset with entities in the reference dataset using aggregated matrix 300 because the features in the reference dataset and the features in the candidate dataset do not have any overlap. To be able to determine the similarity between the entities, aggregated matrix 300 may need to be normalized by filling the features for both datasets.

FIG. 4 is a flow chart 400 illustrating an example of a method for identifying unique candidate entities in a candidate dataset that are not described as associated with the baseline feature but are likely associated with the baseline feature, as described above with respect to block 230, according to certain embodiments. Operations in flow chart 400 may be performed by one or more processing devices, such as various engines or modules of system 100.

At block 410, the one or more processing devices (e.g., more specifically, dataset aggregation module 132) generate an aggregated matrix that includes entities from a reference dataset including first entities and a candidate dataset including second entities. The entities in the reference dataset may be described as associated with the baseline feature, while the entities in the candidate dataset may or may not be described as associated with the baseline feature. In some embodiments, some entities may be included in both the reference dataset and the candidate dataset. Thus, if the reference dataset includes m1 entities and the candidate dataset includes m2 entities, the total number of unique entities in the aggregated matrix may be m3≤m1+m2. The aggregated matrix also includes features associated with the entities from the reference dataset and the candidate dataset. In some embodiments, the features include all unique features included in the reference dataset and the candidate dataset. For example, the reference dataset may include n1 features, the candidate dataset may include n2 features, and the total number of features in the aggregated matrix may be n3≤n1+n2. The features for an entity that is both in the reference dataset and the candidate dataset may be combined into one entry (e.g., one row) in the aggregated matrix. Thus, the m1×n1 matrix for the reference dataset and the m2×n2 matrix for the candidate dataset may be combined to form a m3×n3 aggregated matrix. In some embodiments, the aggregated matrix may be a sparse matrix because some features for some entities may not be described in the reference dataset or the candidate dataset.

FIG. 5 illustrates an example of an aggregated matrix 500 that includes entities from a reference dataset and entities from a candidate dataset. In aggregated matrix 500, each row represents one entity (e.g., a user of a software application or a service), and each column represents a feature (or trait) $t_1$, $t_2$, ..., $t_{m-1}$, or $t_m$, where $t_1$ may be a baseline feature. Identifications of entities $u_1$, $u_2$, ..., $u_{n-1}$, and $u_n$ are unique identifications of entities. In the example show in FIG. 5, entities $u_1$, $u_2$, $u_3$, $u_4$, and the like may be in the first entities from the reference dataset, and entities $u_{n-3}$, $u_{n-2}$, $u_{n-1}$, $u_n$, and the like may be in the second entities from the candidate dataset.

As shown by row 510 in FIG. 5, many of the m×n elements in aggregated matrix 500 may not have an associated value. For example, features $t_4$, $t_5$, $t_{m-2}$, $t_{m-1}$, and $t_m$ for entity $u_1$ may not be specified or described, or may have a value NA or NaN as described above. Entity $u_{n-3}$ from the candidate dataset and represented by row 520 may be described as associated with feature ti as indicated by a value "1" in the corresponding matrix element, entity $u_{n-2}$ from the candidate dataset and represented by row 530 may be described as not associated with feature $t_1$ as indicated by a value "0" in the corresponding matrix element, while feature $t_1$ for entities $u_{n-1}$ and $u_n$ (represented by rows 540 and 550) may not be described in the candidate dataset.

At block 420, the one or more processing devices (e.g., more specifically, dataset normalization engine 134) determine missing values for elements in the aggregated matrix based on existing values in the aggregated matrix and using various matrix completion techniques to complete the aggregated matrix. One example of the matrix completion techniques for filling the aggregated matrix is a spectral regularization technique described in Mazumder et al., "Spectral Regularization Algorithms for Leaning Large Incomplete Matrices," Journal of Machine Learning Research, 2010 (11), pp. 2287-2322.

At block 430, the one or more processing devices (e.g., more specifically, clustering engine 136) form a cluster of data points representing the first entities in a multi-dimensional space based on the features in the aggregated matrix other than the baseline feature. For example, the one or more processing devices may map each of the first entities to a data point in the multi-dimensional space based on values in the aggregated matrix. In some embodiments, the multi-dimensional space may represent all features in the aggregated matrix other than the baseline feature. In some embodiments, the multi-dimensional space may represent some but not all features in the aggregated matrix and does not represent the baseline feature. In some embodiments, dimensionality reduction techniques (e.g., principal component analysis techniques) may be used to reduce the dimensions of the multi-dimensional space. In some embodiments, a centroid of the cluster of the data points representing the first entities may be determined.

At block 440, the one or more processing devices (e.g., more specifically, threshold distance determination engine 138) determine an average reference distance between the data points representing the first entities in the multi-dimensional space. In some embodiments, the average reference distance may be determined based on the distance between each respective pair of data points representing entities in the first entities. In some embodiments, the average reference distance may be determined based on the average of the distance between each data point representing each respective entity in the first entities and the centroid of the cluster of the data points representing the first entities. The average distance may be used to determine a threshold distance.

At block 450, each unique entity in the second entities that is not described as associated with the baseline feature may be mapped to a respective data point in the multi-dimensional space by, for example, clustering engine 136, and the one or more processing devices (e.g., more specifically, second entities selection engine 142) may determine an average candidate distance between the entity and the first entities in the multi-dimensional space. For example, in some embodiments, the average candidate distance can be determined by measuring the distance between the data point representing the unique entity and the data point representing each respective entity in the first entities. In some embodiments, the average candidate distance can be determined by measuring the distance between the data point representing the unique entity and the centroid of the cluster of the data points representing the first entities.

A distance between two data points describes the similarity of two entities represented by the two data points. Thus, the average candidate distance between a data point and the data points representing the first entities describes the similarity of an entity to the known entities in the target population (e.g., from the reference dataset). The further a data point representing an entity is to the cluster (e.g., the centroid of the cluster), the less likely the entity is part of the target population. Various measures of distance can be used to determine the distance in the multi-dimensional space, such as the Euclidean distance, the Pearson correlation distance, and the Jaccard distance. For example, the Euclidean distance is the straight-line distance in the Euclidean space, where the Euclidean distance between two points X and Y with $x_i$ and $y_i$ as their coordinates (i=1, 2, . . . , n) in a n-dimensional space $R^n$ can be determined by:

$$d_{Euclidean}(X,Y) = \sqrt{\Sigma_i(x_i-y_i)^2}. \quad (1)$$

In some embodiments, the square root in the above equation can be discarded to speed up the calculation, without changing the clustering results:

$$d_{Euclidean}'(X,Y) = \Sigma_i(x_i-y_i)^2. \quad (2)$$

Unlike the Euclidean distance, the Pearson correlation distance (or simply Pearson distance or Pearson correlation) measures the linear dependence of two vectors. For example, for two vectors represented by two points X and Y with $x_i$ and $y_i$ as their coordinates (i=1, 2, . . . , n) in the n-dimensional space $R^n$, Pearson correlation distance can be defined as:

$$d_{Pearson}(X, Y) = 1 - Corr(X, Y) = 1 - \frac{E[(X-\mu_X)(Y-\mu_Y)]}{\sigma_X \sigma_Y}, \quad (3)$$

Where E denotes the expected value, $\mu_X$ and $\mu_Y$ are the averages of $x_i$ and $y_i$, respectively, and $\sigma_X$ and $\sigma_Y$ are the standard deviations of $x_i$ and $y_i$, respectively. Because the correlation coefficient Corr(X, Y) is between −1 and 1, $d_{Pearson}$ lies within [0, 2]. When the features are represented by binary values "0" and "1" as shown in FIG. 4, X=~Y (e.g., X=(1,0,1)=Y) represents a perfect linearly dependent case, whereas X=~Y (i.e., X is the complement of Y for every element, e.g. X=(1, 0, 1) and Y=(0, 1, 0)) represents a perfect negatively linearly dependent case. In the perfect linearly dependent case, X overlaps with Y, and $d_{Pearson}$(X, Y) has the minimum value 0. In the perfect negatively linearly dependent case, X is farthest from Y, and $d_{Pearson}$(X, Y) has the maximum value 2.

There are many other measures of distance, such as, for example, Manhattan distance, Chebyshev distance, cosine distance, Jaccard distance, Hamming distance, and the like. The distance measure to use can be determined based on, for example, the computation cost and accuracy. In addition, it is desirable that the distance has the minimum value when two points overlap, and has the maximum value when two points are the farthest apart. Both Euclidean distance and the Pearson correlation distance meet this criterion.

At block 460, for each entity in the second entities that is not described as associated with the baseline feature, the one or more processing devices (e.g., more specifically, second entities selection engine 142) determine the likelihood that the entity is associated with the baseline feature based on the average candidate distance and the average reference distance. In general, the smaller the average candidate distance, the higher the likelihood that the entity is associated with the baseline feature and thus is part of the target population. If the average candidate distance is below the average reference distance, the corresponding entity in the second entities may be determined to be associated with the baseline feature. In some embodiments, a threshold value different from the average reference distance may be used to determine whether the corresponding entity has the baseline feature and thus is part of the target population.

As described above with respect to block 240, in some embodiments, the merit attribute of the candidate dataset is the weighted sum of the number of the first unique candidate entities and the number of the second unique candidate entities in the candidate dataset. For example, if the total number of the first unique candidate entities in the candidate dataset that are described in the candidate dataset as associated with the baseline feature is N, the total number of the second unique candidate entities in the candidate dataset that are not described as associated with the baseline feature but are likely associated with the baseline feature is N', the merit attribute $M_{estimate}$ may be determined by:

$$M_{estimate} = \alpha_0 + \alpha_1 N + \alpha_2 N', \quad (4)$$

where $\alpha_1$ is the weight for each first unique candidate entity and $\alpha_2$ is the weight for each second unique candidate entity. In general, weight $\alpha_1$ for each first unique candidate entity may be higher than weight $\alpha_2$ for each second unique candidate entity because the first unique candidate entity is known to have the baseline feature, while the second unique candidate entity is estimated to likely have the baseline feature.

As also described above, in some embodiments, the weight for each of the first unique candidate entities and the weight for each of the second unique candidate entities can be determined, for example, using a regression technique. In one example, the merit attributes for some training datasets may have been manually determined or otherwise obtained. For example, the economic values of the training dataset may be obtained. The total number N of the first unique candidate entities and the total number N' of the second unique candidate entities in each training dataset can be determined using the techniques described above. A linear regression technique may then be used to determine the weights $\alpha_1$ and $\alpha_2$ based on the merit attribute and the numbers N and N' for each training dataset. In some embodiments, the weights may be assigned based on the confidence level (e.g., the likelihood) that the second unique candidate entities have the baseline feature. For example, in some embodiments, the weights may be assigned based on the distances between the data points representing the second unique candidate entities and the centroid of the cluster of the data points representing the entities in the reference dataset. In some embodiments, the weights may be manually assigned. In some embodiments, the weights may be assigned more aggressively (e.g., assigning a larger value for weight $\alpha_2$) or more conservatively (e.g., assigning a lower value for weight $\alpha_2$).

Table 1 shows an example of pseudo code for applying machine-learning techniques to evaluate candidate datasets for use by software applications according to certain embodiments described above.

TABLE 1

Pseudo code of an example method
for evaluating candidate datasets

Input:
  T: the type of threshold, such as "mean," which is the mean distance of all known data points (entities) in targeting population) from the reference dataset to its centroid.
  Dt: Distance type, such as 'Euclidean' or 'Pearson' (Pearson correlation).
  df_candidate: the candidate dataset.
  df_reference: the customer's dataset (i.e., reference dataset).
  BST: the baseline trait(s), which may be binary variable(s) pre-specified by the customer.
  $\alpha_1$: the merit value per new entity who has the BST.
  $\alpha_2$: the merit value per new entity who does not have BST.
Main program:
{
df_candidate_new = entities from df_candidate who are not in df_reference
if df_candidate_new has BST:
    df_candidate_new_1 = entities from df_candidate_new whose BST == 1
    df_candidate_new_0 = entities from df_candidate_new whose BST == 0
    N = count1(df_candidate_new_1), N' = count2(df_candidate_new_0)
else:
    N = 0, N' = count2(df_candidate_new)
Merit value = $\alpha_1$N + $\alpha_2$N'
Output: Merit value
}
function count1(data set: df):
{
Output: number of unique entities in df who has the BST
}
function count2(data set: df):
{
  // Expand the traits in df_reference and df so that they have the same TABLE 1-continued Pseudo code of an example method
for evaluating candidate datasets traits
if traits in df_reference and traits in df are not the same:
    allTraits = set(traits in df_reference) + set(traits in df)
    df_reference' = df_reference with allTraits.
    df' = df with allTraits.
    fill the missing values in df_reference' and df' by spectral regularization algorithm
end if
// Calculate the centroid of the df_reference '
for each trait_i in df_reference':
    centroid$_{trait\_i}$= mean(column trait_i of df_reference')
end for
// Calculate the threshold: (take 'mean' as the example)
if T == 'mean':
    if Dt is 'Euclidean':
        threshold = mean($d_{Euclidean}$(entity_i, centroid)) for each entity_i in df_reference'
    end if
    if Dt is 'Pearson':
        threshold = mean($d_{Pearson}$(entity_i, centroid)) for each entity_i in df_reference'
    end if
end if
// Count N'
count = 0
for every entity_j in df':
    if Dt is 'Euclidean':
        if $d_{Euclidean}$(entity_i, centroid) <= threshold:
            count += 1
        end if
    end if
    if Dt is 'Pearson':
        if $d_{Pearson}$(entity_i, centroid) <= threshold:
            count += 1
        end if
    end if
end for
Output: count
}

In the embodiments and pseudo code described above, several parameters may be used, including the threshold distance, weight $\alpha_1$, and weight $\alpha_2$. Weight $\alpha_1$ is related to N, the total number of the first unique candidate entities in the candidate dataset that are described in the candidate dataset as associated with the baseline feature and thus are most part of the target population. The threshold distance and weight $\alpha_2$ are related to N', the total number of the second unique candidate entities in the candidate dataset that are not described as associated with the baseline feature but are likely associated with the baseline feature and thus are predicted to be part of the target population. In some embodiments, the threshold distance and weight $\alpha_2$ depend on each other. For example, when the threshold distance is increased, more entities in the candidate dataset may be included in the N' entities, which may cause the weight $\alpha_2$ for each entities in the N' entities to decrease. In some embodiments, the threshold distance may be set to a constant value, such as the mean value of the distances between each data point representing an entity in the reference dataset and the centroid of the cluster, and weight $\alpha_2$ may be tuned to fit the training datasets to the model described by Equation (4).

As described above, the total number N' of the second unique candidate entities in the candidate dataset that are not described as associated with the baseline feature but are likely associated with the baseline feature may depend on the threshold distance and the type of distance measure used. Different distance measures, such as the Euclidean distance and Pearson correlation distance, are evaluated in a simulation using 60 candidate datasets, one of which is used as the reference dataset. In the simulation, the baseline traits are selected randomly, and a Gaussian distributed data price is used for model validation. The simulation results and cross validation show a very high average accuracy, such as 87% or higher.

Figure 6:
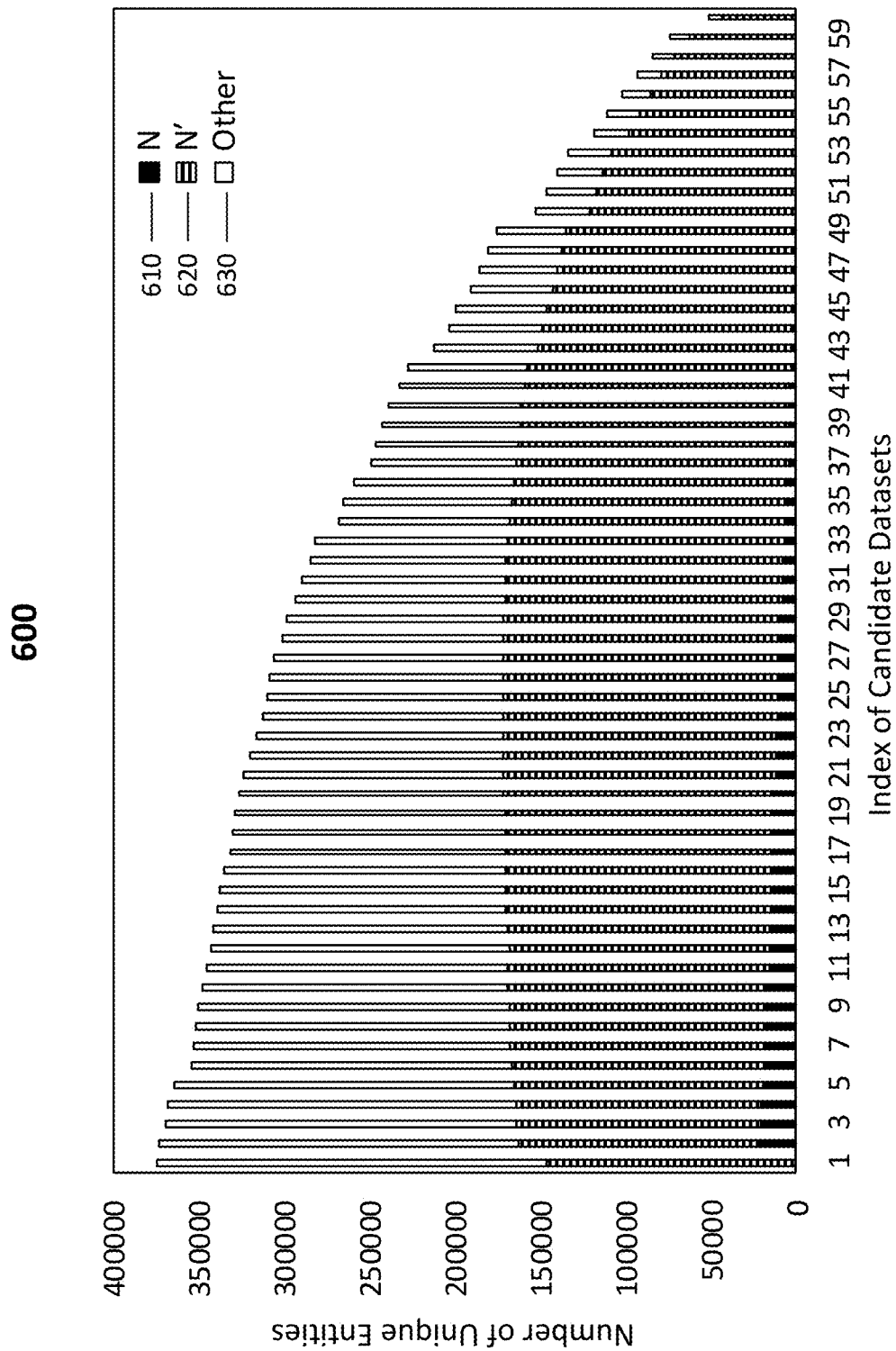
FIG. 6 is a chart illustrating examples of simulated results based on Euclidean distance and using techniques disclosed herein according to certain embodiments.

FIG. 6 is a chart 600 illustrating examples of simulated results based on Euclidean distance and using techniques disclosed herein according to certain embodiments. As described above, 60 datasets are used in the simulation. Chart 600 shows the number N of the first unique candidate entities (represented by solid-filled bars 610) in each candidate dataset that are described in the candidate dataset as associated with the baseline feature, the number N' of the second unique candidate entities (represented by pattern-filled bars 620) in the candidate dataset that are not described as associated with the baseline feature but are likely associated with the baseline feature, and the number of unqualified entities (represented by unfilled bars 630) in the candidate dataset that are determined as not in the target population. The horizontal axis represents the indexes of the candidate datasets, which are ordered such that the total number of unique entities in each respective dataset (represented by the vertical axis) is in a descending order. For the results shown in chart 600, the Euclidean distance is computed using Equation (2), and the threshold is set to the mean Euclidean distance between each respective data point in the data points representing all entities in the reference dataset and the centroid of the data points in a multi-dimensional space.

Figure 7:
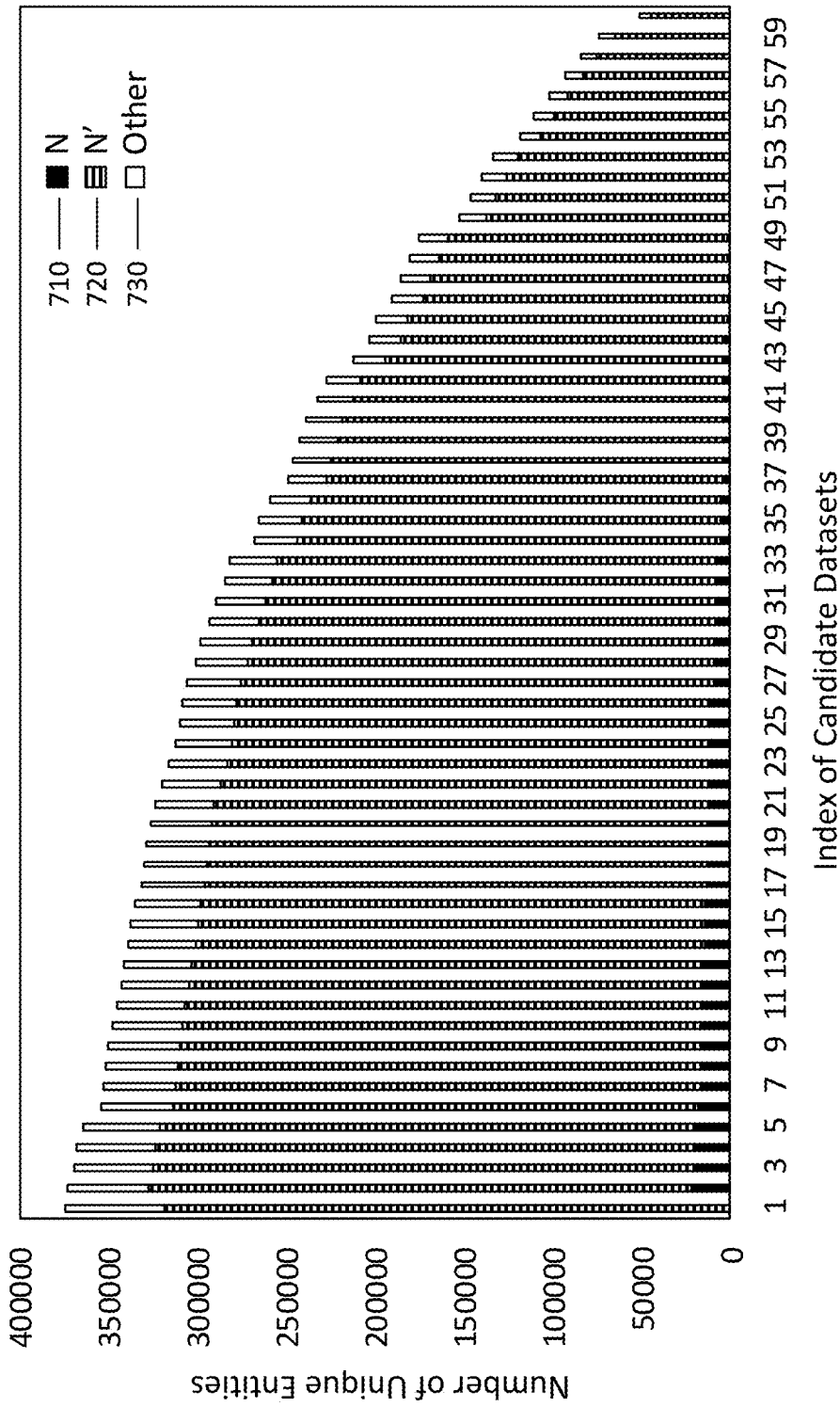
FIG. 7 is a chart illustrating examples of simulated results based on Euclidean distance and using techniques disclosed herein according to certain embodiments.

FIG. 7 is a chart 700 illustrating examples of simulated results based on Euclidean distance and using techniques disclosed herein according to certain embodiments. The 60 datasets shown in FIG. 7 are the same as the 60 datasets shown in FIG. 7. Chart 700 shows the number N of the first unique candidate entities (represented by solid-filled bars 710) in each candidate dataset that are described in the candidate dataset as associated with the baseline feature, the number N' of the second unique candidate entities (represented by pattern-filled bars 720) in the candidate dataset that are not described as associated with the baseline feature but are likely associated with the baseline feature, and the number of unqualified entities (represented by unfilled bars 730) in the candidate dataset that are determined as not in the target population. The horizontal axis represents the indexes of the candidate datasets, which are ordered such that the total number of unique entities in each respective dataset (represented by the vertical axis) is in a descending order. For the results shown in chart 700, the Euclidean distance is computed using Equation (2), and the threshold is set to two times of the mean Euclidean distance between each respective data point in the data points representing all entities in the reference dataset and the centroid of the data points in the multi-dimensional space.

As shown by FIGS. 6 and 7, for a same candidate dataset, when the threshold distance increases, more unique entities are predicted to have the baseline feature(s) and thus are in the target population. Because the merit attribute of a candidate dataset would not change with the threshold distance used for the evaluation, the weight for each entity predicted to have the baseline feature(s) would reduce when the threshold distance increases.

Figure 8:
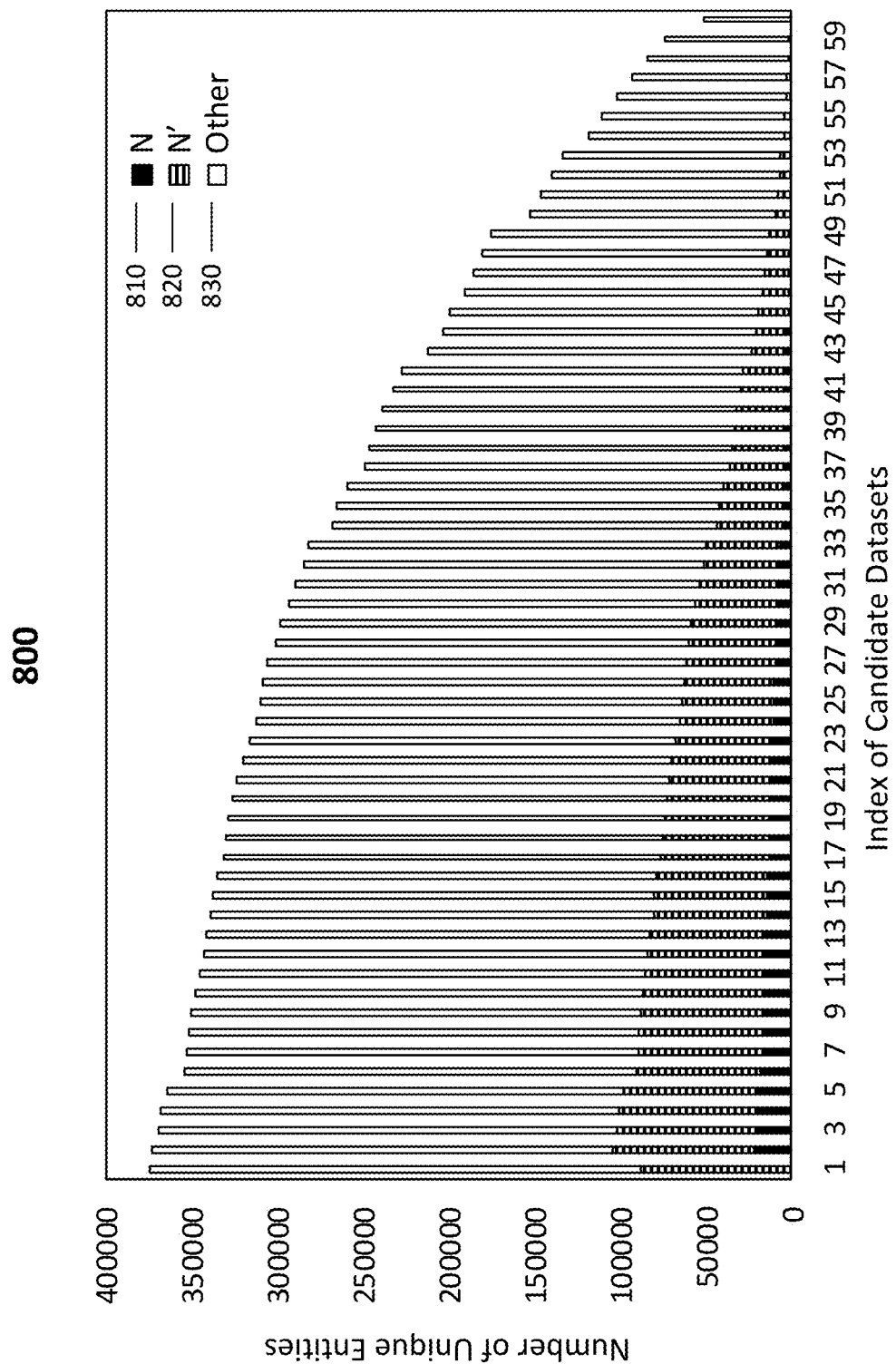
FIG. 8 is a chart illustrating examples of simulated results based on Pearson correlation distance and using techniques disclosed herein according to certain embodiments.

FIG. 8 is a chart 800 illustrating examples of simulated results based on Pearson correlation distance and using techniques disclosed herein according to certain embodiments described above. The same 60 datasets used in the simulation based on Euclidean distance are used in the simulation based on Pearson correlation distance. Chart 800 shows the number N of the first unique candidate entities (represented by solid-filled bars 810) in each candidate dataset that are described in the candidate dataset as associated with the baseline feature, the number N' of the second unique candidate entities (represented by pattern-filled bars 820) in the candidate dataset that are not described as associated with the baseline feature but are likely associated with the baseline feature, and the number of unqualified entities (represented by unfilled bars 830) in the candidate dataset that are determined as not in the target population. The horizontal axis represents the indexes of the candidate datasets, which are ordered such that the total number of unique entities in each respective dataset (represented by the vertical axis) is in a descending order. For the results shown in chart 800, the Pearson correlation distance is computed using Equation (3), and the threshold is set to the mean Pearson correlation distance between each respective data point in the data points representing all entities in the reference dataset and the centroid of the data points in a multi-dimensional space.

Figure 9:
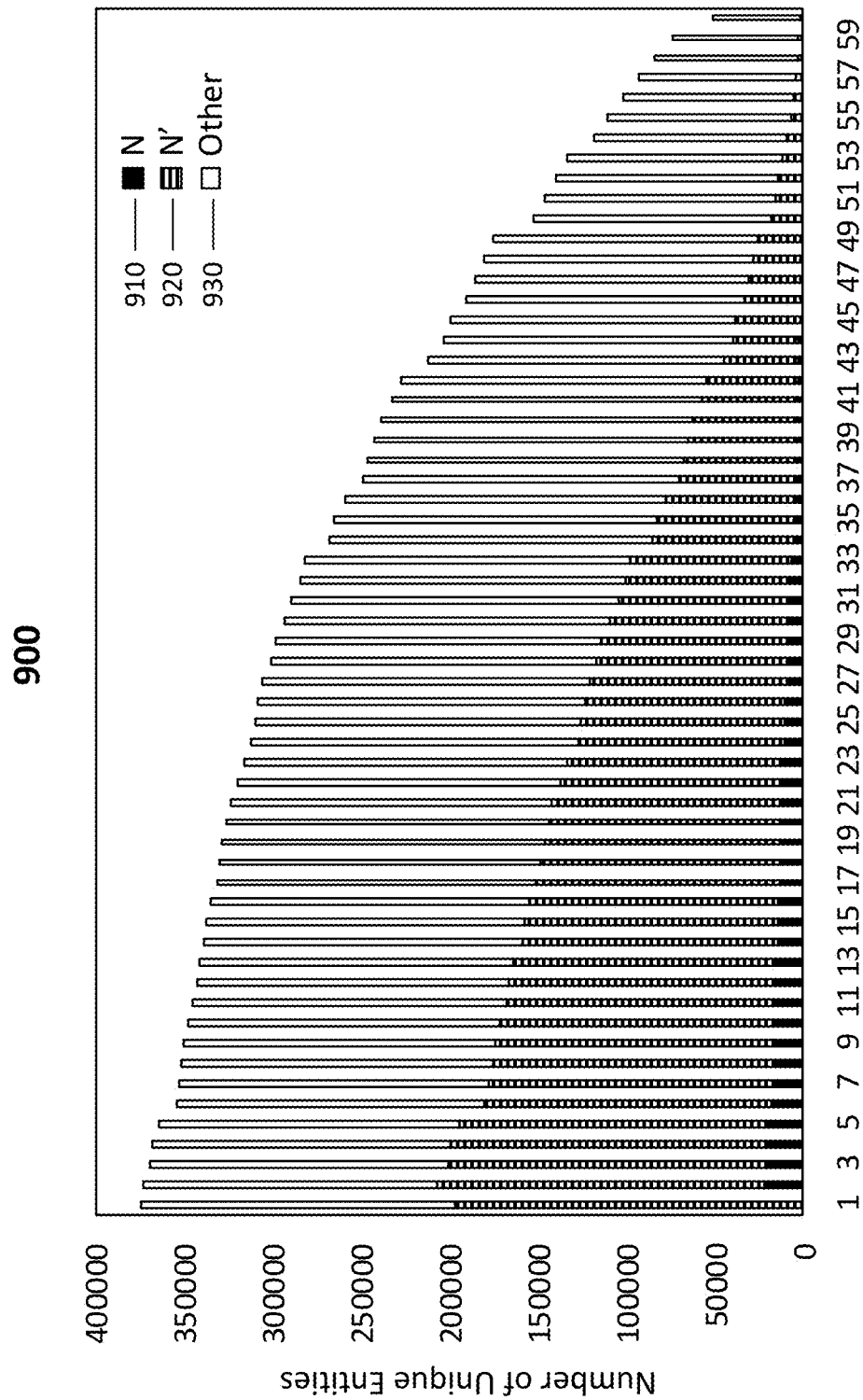
FIG. 9 is a chart illustrating examples of simulated results based on Pearson correlation distance and using techniques disclosed herein according to certain embodiments.

FIG. 9 is a chart 900 illustrating examples of simulated results based on Pearson correlation distance and using techniques disclosed herein according to certain embodiments described above. The 60 datasets shown in FIG. 9 are the same as the 60 datasets shown in FIG. 8. Chart 900 shows the number N of the first unique candidate entities (represented by solid-filled bars 910) in each candidate dataset that are described in the candidate dataset as associated with the baseline feature, the number N' of the second unique candidate entities (represented by pattern-filled bars 920) in the candidate dataset that are not described as associated with the baseline feature but are likely associated with the baseline feature, and the number of unqualified entities (represented by unfilled bars 930) in the candidate dataset that are determined as not in the target population. The horizontal axis represents the indexes of the candidate datasets, which are ordered such that the total number of unique entities in each respective dataset (represented by the vertical axis) is in a descending order. For the results shown in chart 900, the Pearson correlation distance is computed using Equation (3), and the threshold is set to two times of the mean Pearson correlation distance between each respective data point in the data points representing all entities in the reference dataset and the centroid of the data points in the multi-dimensional space.

As shown by FIGS. 8 and 9, for a same candidate dataset, when the threshold distance increases, more unique entities are predicted to have the baseline feature(s) and thus are likely to be in the target population. Because the merit attribute of a candidate dataset would not change with the threshold distance used for the evaluation, the weight for each entity predicted to have the baseline feature(s) would reduce when the threshold distance increases.

Figure 10:
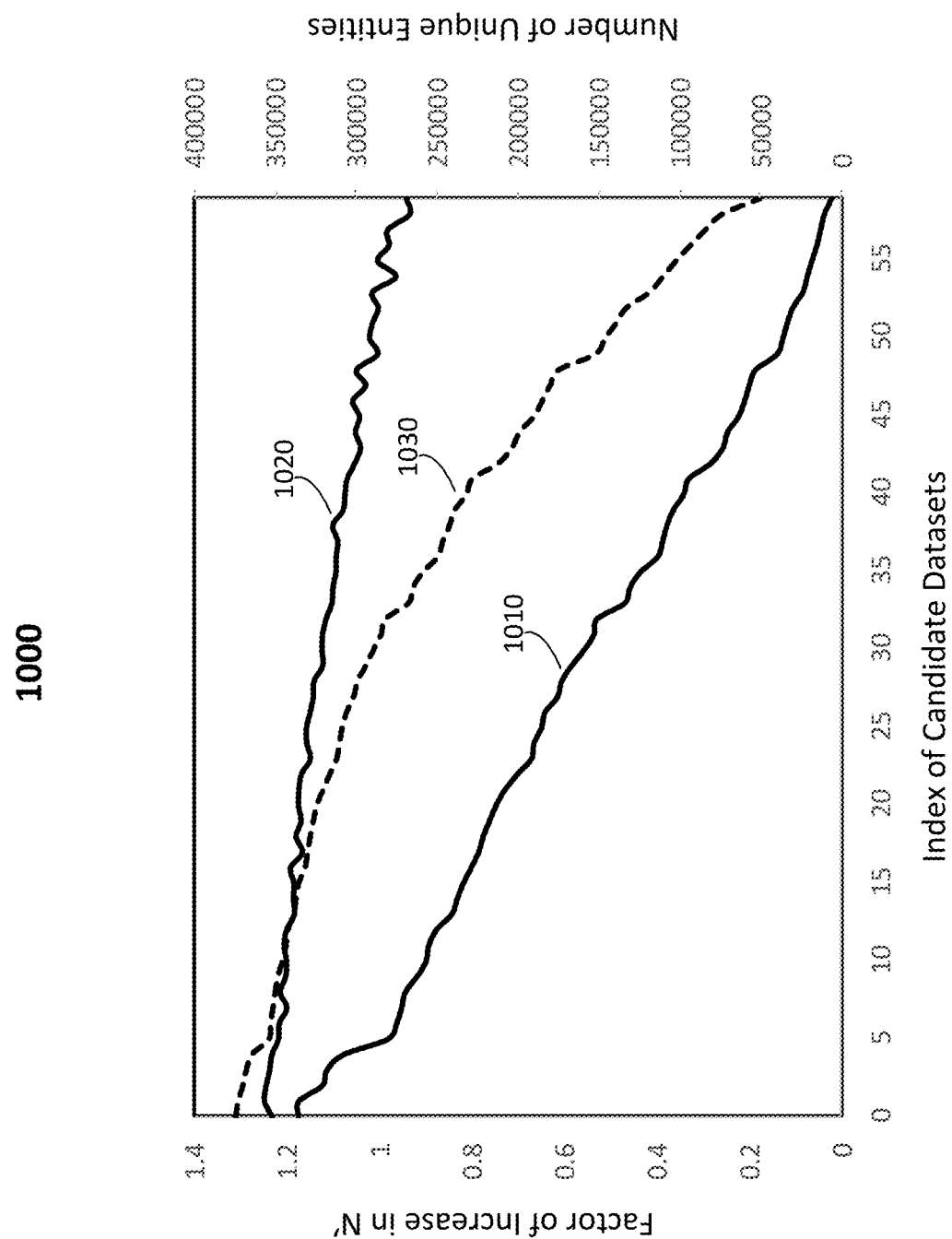
FIG. 10 is an example of a diagram illustrating the increase in the number of entities predicted to be part of the target population when the threshold is doubled, based on results of simulation using techniques disclosed in certain embodiments.

FIG. 10 is a diagram 1000 illustrating the increase in the number of entities (N') predicted to be part of the target population when the threshold distance is doubled, based on the simulation results shown in FIGS. 6-9 using techniques disclosed in certain embodiments. In diagram 1000, the horizontal axis represents the indexes of the candidate datasets, which are ordered such that the total number of unique entities in each respective dataset (represented by the vertical axis) is in a descending order. The primary vertical axis represents the factor of increase in N' determined by $(N'(2T_d) - N'(T_d))/N'(T_d)$, where $T_d$ is a pre-specified threshold distance, such as the mean distance between each respective data point in the data points representing all entities in the reference dataset and the centroid of the data points in the multi-dimensional space. The secondary vertical axis represents the number of unique entities.

A curve 1010 shows the increase in N' when the Euclidean distance is used and the threshold Euclidean distance is doubled, and curve 1020 shows the increase in N' when the Pearson correlation distance is used and the threshold distance is doubled. A curve 1030 shows the number of unique entities in each respective candidate dataset. Curve 1020 shows that the factor of increase in N' is consistently around about 1.1 (i.e., N' is approximately doubled) when the threshold $T_d$ is doubled, while curve 1010 shows that the factor of increase in N' for a candidate dataset when the threshold $T_d$ approximately correlates with the number of unique entities in the candidate dataset shown by curve 1030. Diagram 1000 suggests that the Pearson correlation distance may be a better measure of distance than the Euclidean distance.

Figure 11:
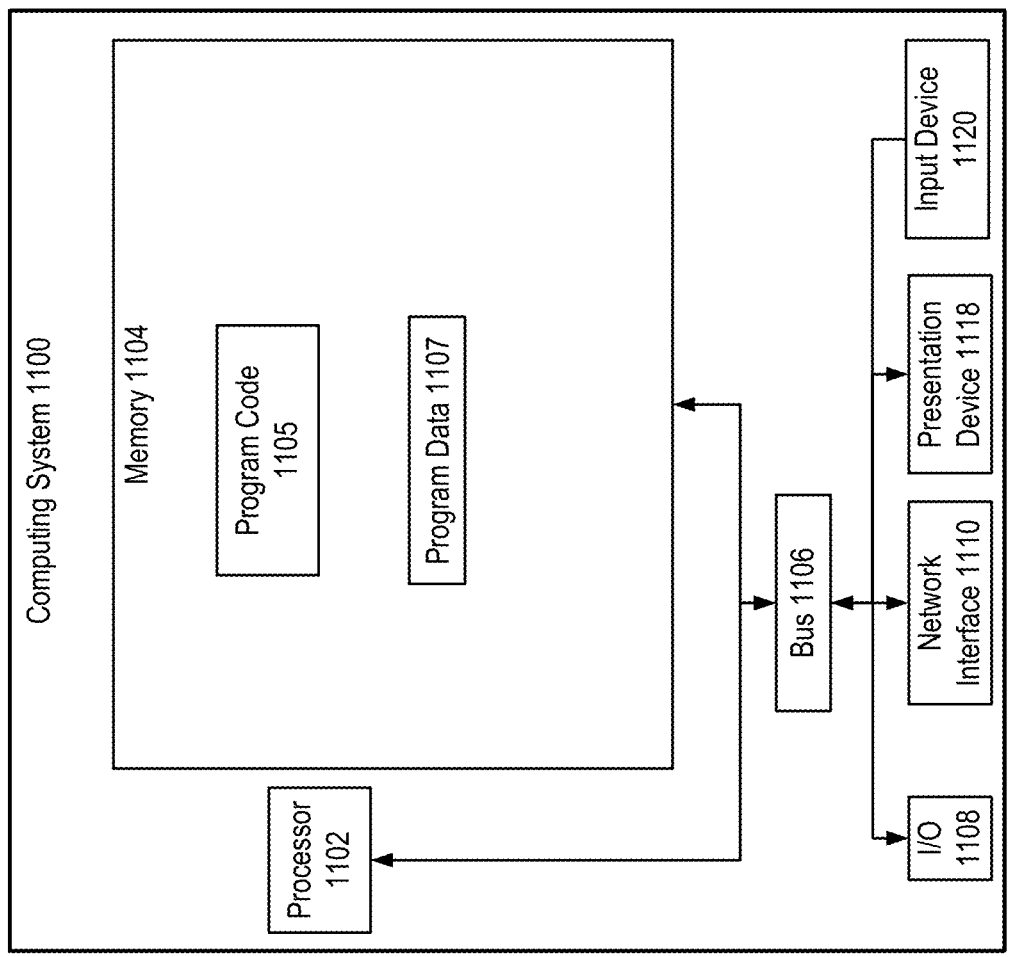
FIG. 11 illustrates an example of a computing system for implementing some of the embodiments disclosed herein.

A computing system, such as one including computing system 1100 of FIG. 11, can be configured to perform the illustrative flows and techniques described above according to some embodiments. Instructions for performing the operations of the illustrative flows can be stored as computer-readable instructions on a non-transitory computer-readable medium of the computer system. As stored, the instructions represent programmable modules that include code or data executable by a processor(s) of the computer system. The execution of such instructions configures the computer system to perform the specific operations shown in the figures and described herein. Each programmable module in combination with the processor represents a means for performing a respective operation(s). While the operations are illustrated in a particular order, it should be understood that no particular order is necessary and that one or more operations may be omitted, skipped, and/or reordered.

Any suitable computing system or group of computing systems can be used for performing the operations described herein. For example, FIG. 11 depicts an example of the computing system 1100 that may be used to implement certain engines or modules of system 100. The depicted example of a computing system 1100 includes a processor 1102 communicatively coupled to one or more memory devices 1104. The processor 1102 executes computer-executable program code stored in a memory device 1104, accesses information stored in the memory device 1104, or both. Examples of the processor 1102 include a microprocessor, an application-specific integrated circuit ("ASIC"), a field-programmable gate array ("FPGA"), or any other suitable processing device. The processor 1102 can include any number of processing devices, including a single processing device.

A memory device 1104 includes any suitable non-transitory computer-readable medium for storing program code 1115, program data 1116, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C #, Visual Basic, Java, Python, Perl, JavaScript, and ActionScript.

The computing system 1100 may also include a number of external or internal devices, an input device 1120, a presentation device 1118, or other input or output devices. For example, computing system 1100 is shown with one or more input/output ("I/O") interfaces 1108. An I/O interface 1108 can receive input from input devices or provide output to output devices. One or more buses 1106 are also included in the computing system 1100. The bus 1106 communicatively couples one or more components of a respective one of the computing system 1100.

The computing system 1100 executes program code 1105 that configures the processor 1102 to perform one or more of the operations described herein. Examples of the program code 1105 include, in various embodiments, program code for implementing the pseudo code described in Table 1. The program code may be resident in the memory device 1104 or any suitable computer-readable medium and may be executed by the processor 1102 or any other suitable processor.

In some embodiments, one or more memory devices 1104 stores program data 1107 that includes one or more datasets and models described herein. Examples of these datasets include interaction data, experience metrics, training interaction data or historical interaction data, transition importance data, etc. In some embodiments, one or more of data sets, models, and functions are stored in the same memory device (e.g., one of the memory devices 1104). In additional or alternative embodiments, one or more of the programs, data sets, models, and functions described herein are stored in different memory devices 1104 accessible via a data network.

In some embodiments, the computing system 1100 also includes a network interface device 1110. The network interface device 1110 includes any device or group of devices suitable for establishing a wired or wireless data connection to one or more data networks. Non-limiting examples of the network interface device 1110 include an Ethernet network adapter, a modem, and/or the like. The computing system 1100 is able to communicate with one or more other computing devices (e.g., a computing device executing an environment evaluation system 102) via a data network using the network interface device 1110.

In some embodiments, the computing system 1100 also includes the input device 1120 and the presentation device 1118 depicted in FIG. 11. An input device 1120 can include any device or group of devices suitable for receiving visual, auditory, or other suitable input that controls or affects the operations of the processor 1102. Non-limiting examples of the input device 1120 include a touchscreen, a mouse, a keyboard, a microphone, a separate mobile computing device, etc. A presentation device 1118 can include any device or group of devices suitable for providing visual, auditory, or other suitable sensory output. Non-limiting examples of the presentation device 1118 include a touchscreen, a monitor, a speaker, a separate mobile computing device, etc.

Although FIG. 11 depicts the input device 1120 and the presentation device 1118 as being local to the computing device that executes the environment evaluation system 102, other implementations are possible. For instance, in some embodiments, one or more of the input device 1120 and the presentation device 1118 can include a remote client-computing device that communicates with the computing system 1100 via the network interface device 1110 using one or more data networks described herein.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some embodiments. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

The invention claimed is:

1. A method for applying machine-learning techniques to evaluate candidate datasets for use by software applications, the method comprising performing, by one or more processing devices, operations including:
   identifying, in a candidate dataset identifying first entities associated with first features, first unique candidate entities that are absent from a reference dataset identifying second entities associated with second features that include a baseline feature of a target population and that are associated with the baseline feature in the candidate dataset;
   forming, in a multi-dimensional space and based on a subset of the second features lacking the baseline feature, a cluster of data points representing the second entities;
   mapping a subset of the first entities that are absent from the reference dataset and that are not in the first unique candidate entities to additional data points, respectively in the multi-dimensional space;
   identifying, from the subset of the first entities, second unique candidate entities corresponding to a subset of the additional data points within a threshold distance of the cluster;
   determining a merit attribute of the candidate dataset based on a first weight for each first unique candidate entity, a second weight for each second unique candidate entity, a number of the first unique candidate entities in the candidate dataset, and a number of the second unique candidate entities in the candidate dataset; and selecting the candidate dataset as input data for a target software application based on the merit attribute of the candidate dataset being greater than a threshold value.

2. The method of claim 1, wherein identifying the second unique candidate entities comprises:

determining, in the multi-dimensional space, a centroid of the cluster of the data points representing the second entities;

determining, in the multi-dimensional space, an average reference distance between each data point in the data points representing the second entities and the centroid of the cluster; and determining the threshold distance based on the average reference distance.

3. The method of claim 2, wherein identifying the second unique candidate entities further comprises:

determining, in the multi-dimensional space, a distance between a respective additional data point and the centroid of the cluster.

4. The method of claim 3, wherein the distance between the respective additional data point and the centroid of the cluster includes a Pearson correlation distance, Euclidean distance, cosine distance, or Jaccard distance.

5. The method of claim 1, wherein mapping the subset of the first entities to the additional data points in the multi-dimensional space comprises:

mapping each first entity in the subset of the first entities to a respective additional data point in the multi-dimensional space based on corresponding values in the aggregated matrix.

6. The method of claim 5, wherein mapping the subset of the first entities to the additional data points in the multi-dimensional space comprises:

mapping each first entity in the subset of the first entities to a respective additional data point in the multi-dimensional space based on corresponding values in the aggregated matrix.

7. The method of claim 1, wherein the operations further comprise determining, based on merit attributes of training datasets, the first weight and the second weight using linear regression.

8. The method of claim 1, wherein determining the merit attribute of the candidate dataset comprises:

determining a weighted sum of the number of the first unique candidate entities in the candidate dataset and the number of the second unique candidate entities in the candidate dataset, wherein each of the first unique candidate entities is associated with the first weight; and wherein each of the second unique candidate entities is associated with the second weight.

9. A system comprising:

a processing device; and a non-transitory computer-readable medium communicatively coupled to the processing device, wherein the processing device is configured to execute program code stored in the non-transitory computer-readable medium and thereby perform operations comprising:

identifying, in a candidate dataset identifying first entities associated with first features, first unique candidate entities that are absent from a reference dataset identifying second entities associated with second features that include a baseline feature of a target population and that are associated with the baseline feature in the candidate dataset;

forming, in a multi-dimensional space and based on a subset of the second features lacking the baseline feature, a cluster of data points representing the second entities;

mapping a subset of the first entities that are absent from the reference dataset and that are not in the first unique candidate entities to additional data points, respectively in the multi-dimensional space;

identifying, from the subset of the first entities, second unique candidate entities corresponding to a subset of the additional data points within a threshold distance of the cluster;

determining a merit attribute of the candidate dataset based on a first weight for each first unique candidate entity, a second weight for each second unique candidate entity, a number of the first unique candidate entities in the candidate dataset, and a number of the second unique candidate entities in the candidate dataset; and selecting the candidate dataset as input data for a target software application based on the merit attribute of the candidate dataset being greater than a threshold value.

10. The system of claim 9, wherein identifying the second unique candidate entities comprises:

determining, in the multi-dimensional space, a centroid of the cluster of the data points representing the second entities;

determining, in the multi-dimensional space, an average reference distance between each data point in the data points representing the second entities and the centroid of the cluster;

determining the threshold distance based on the average reference distance; and determining, in the multi-dimensional space, a distance between a respective additional data point and the centroid of the cluster.

11. The system of claim 10, wherein the distance between the respective additional data point and the centroid of the cluster includes a Pearson correlation distance, Euclidean distance, cosine distance, or Jaccard distance.

12. The system of claim 9, wherein forming the cluster of data points representing the second entities comprises:

generating an aggregated matrix that identifies the second entities, the second features, the first entities, and the first features;

estimating missing values in the aggregated matrix using spectral regularization; and mapping, based on the aggregated matrix, the second entities to the data points representing the second entities, wherein coordinates of each data point in the data points representing the second entities are determined based on corresponding values in the aggregated matrix.

13. The system of claim 12, wherein mapping the subset of the first entities to the additional data points in the multi-dimensional space comprises:

mapping each first entity in the subset of the first entities to a respective additional data point in the multi-dimensional space based on corresponding values in the aggregated matrix.

14. The system of claim 9, wherein the operations further comprise determining, based on merit attributes of training datasets, the first weight and the second weight using linear regression.

15. The system of claim 9, wherein determining the merit attribute of the candidate dataset comprises:
    determining a weighted sum of the number of the first unique candidate entities in the candidate dataset and the number of the second unique candidate entities in the candidate dataset,
    wherein each of the first unique candidate entities is associated with the first weight; and
    wherein each of the second unique candidate entities is associated with the second weight.

16. A system comprising:
    means for identifying, in a candidate dataset identifying first entities associated with first features, first unique candidate entities that are absent from a reference dataset identifying second entities associated with second features that include a baseline feature of a target population and that are associated with the baseline feature in the candidate dataset;
    means for forming, in a multi-dimensional space and based on a subset of the second features lacking the baseline feature, a cluster of data points representing the second entities;
    means for mapping a subset of the first entities that are absent from the reference dataset and that are not in the first unique candidate entities to additional data points, respectively in the multi-dimensional space;
    means for identifying, from the subset of the first entities, second unique candidate entities corresponding to a subset of the additional data points within a threshold distance of the cluster;
    means for determining a merit attribute of the candidate dataset based on a first weight for each first unique candidate entity, a second weight for each second unique candidate entity, a number of the first unique candidate entities in the candidate dataset, and a number of the second unique candidate entities in the candidate dataset; and
    means for selecting the candidate dataset as input data for a target software application based on the merit attribute of the candidate dataset being greater than a threshold value.

17. The system of claim 16, wherein the means for identifying the second unique candidate entities comprise:
    means for determining, in the multi-dimensional space, a centroid of the cluster of the data points representing the second entities;
    means for determining, in the multi-dimensional space, an average reference distance between each data point in the data points representing the second entities and the centroid of the cluster;
    means for determining the threshold distance based on the average reference distance; and
    means for determining, in the multi-dimensional space, a distance between a respective additional data point and the centroid of the cluster.

18. The system of claim 17, wherein the distance between the respective additional data point and the centroid of the cluster includes a Pearson correlation distance, Euclidean distance, cosine distance, or Jaccard distance.

19. The system of claim 16, wherein the means for forming the cluster of data points representing the second entities comprise:
    means for generating an aggregated matrix that identifies the second entities, the second features, the first entities, and the first features;
    means for estimating missing values in the aggregated matrix using spectral regularization; and
    means for mapping, based on the aggregated matrix, the second entities to the data points representing the second entities,
    wherein coordinates of each data point in the data points representing the second entities are determined based on corresponding values in the aggregated matrix.

20. The system of claim 16, wherein the means for determining the merit attribute of the candidate dataset comprise:
    means for determining a weighted sum of the number of the first unique candidate entities in the candidate dataset and the number of the second unique candidate entities in the candidate dataset,
    wherein each of the first unique candidate entities is associated with the first weight; and
    wherein each of the second unique candidate entities is associated with the second weight.

* * * * *